H. LANDSIEDEL.
ADDING MACHINE.
APPLICATION FILED APR. 23, 1912.

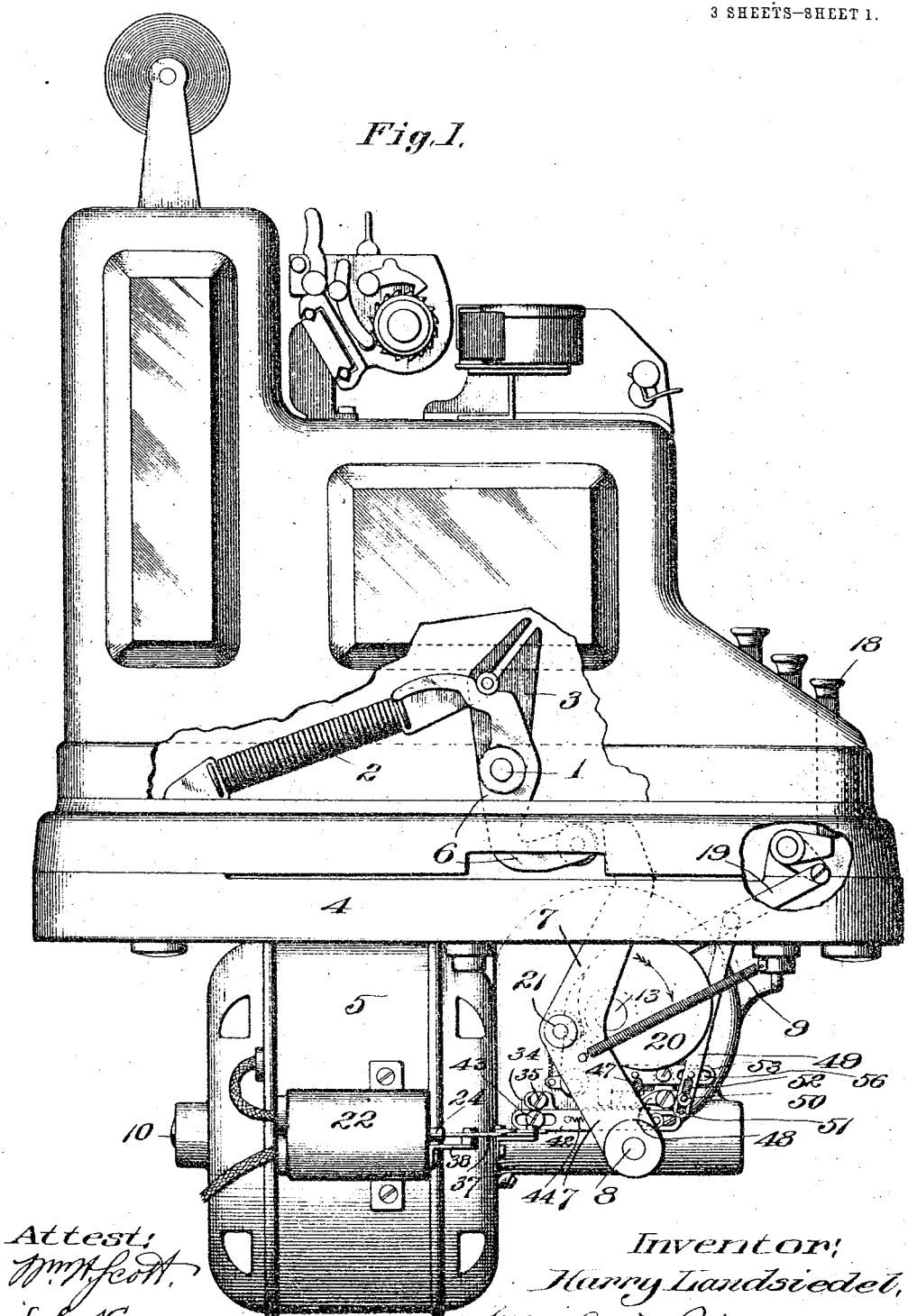

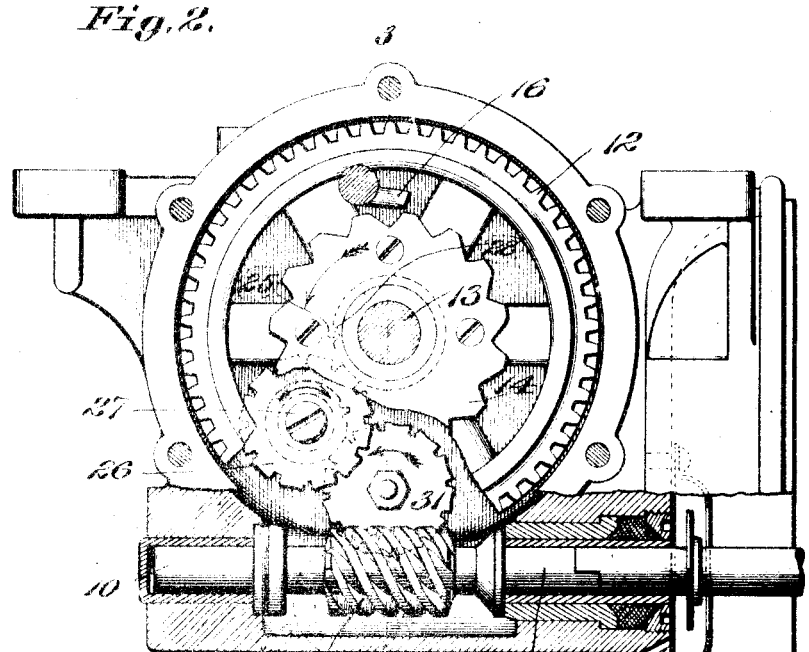

1,119,967.

Patented Dec. 8, 1914.
3 SHEETS—SHEET 3.

Attest:
Wm. J. Scott
L. C. Kingsland

Inventor:
Harry Landsiedel,
by J. D. Rippey,
Atty.

UNITED STATES PATENT OFFICE.

HARRY LANDSIEDEL, OF POPLAR BLUFF, MISSOURI, ASSIGNOR, BY MESNE ASSIGNMENTS, TO THE DALTON ADDING MACHINE COMPANY, OF CINCINNATI, OHIO, A CORPORATION OF OHIO.

ADDING-MACHINE.

1,119,967.  Specification of Letters Patent.  Patented Dec. 8, 1914.

Application filed April 29, 1912.  Serial No. 693,815.

*To all whom it may concern:*

Be it known that I, HARRY LANDSIEDEL, a citizen of the United States, residing at Poplar Bluff, in the county of Butler and State of Missouri, have invented new and useful Improvements in Adding-Machines, of which the following is a specification enabling those skilled in the art to which my invention appertains to understand the same.

This invention relates to operating mechanism for adding machines and the like, whereby the machines may be operated by power driven mechanism instead of by a hand lever or other manually operated connections.

The present invention relates specifically to the combination of an adding machine or the like, and a motor for operating the machine, and the present invention includes, in combination with the machine and the motor, automatic mechanism to cut off the power by which the motor is driven and thereby stop the motor.

An object of the present invention is to provide improved mechanism whereby the running of the motor may be stopped automatically, after a suitable interval, when the machine is left idle and inoperative.

Another object is to provide means, controlled by the motor itself, for cutting off the power of the motor so that the motor will be stopped, after a suitable interval, when the machine is idle.

Other objects will appear from the following description, reference being made to the accompanying drawings in which I have illustrated my invention combined with a Dalton adding machine and the motor for operating said machine.

Figure 5:
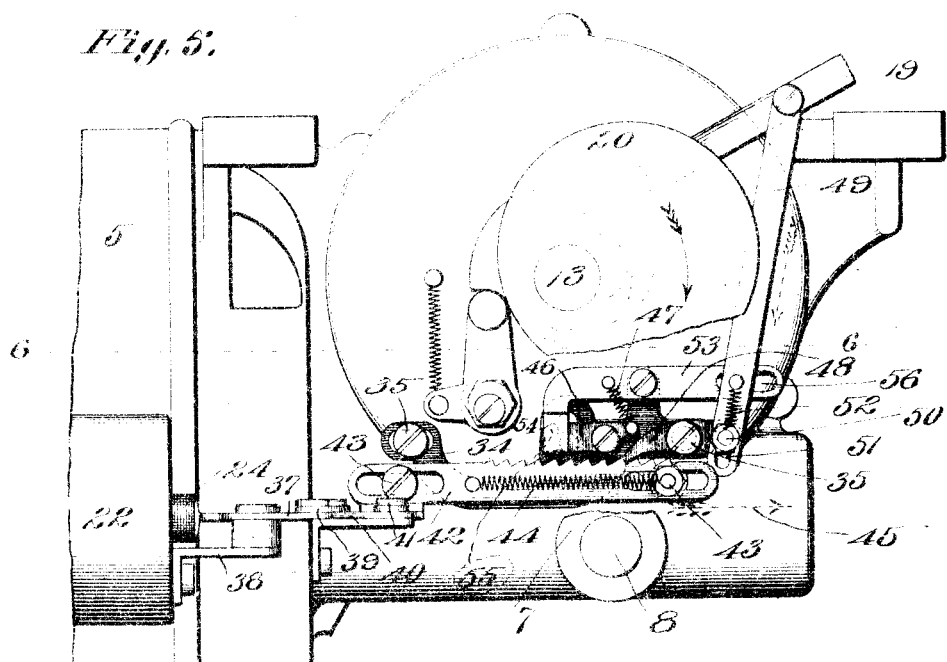
Figures 6, 7, 8:
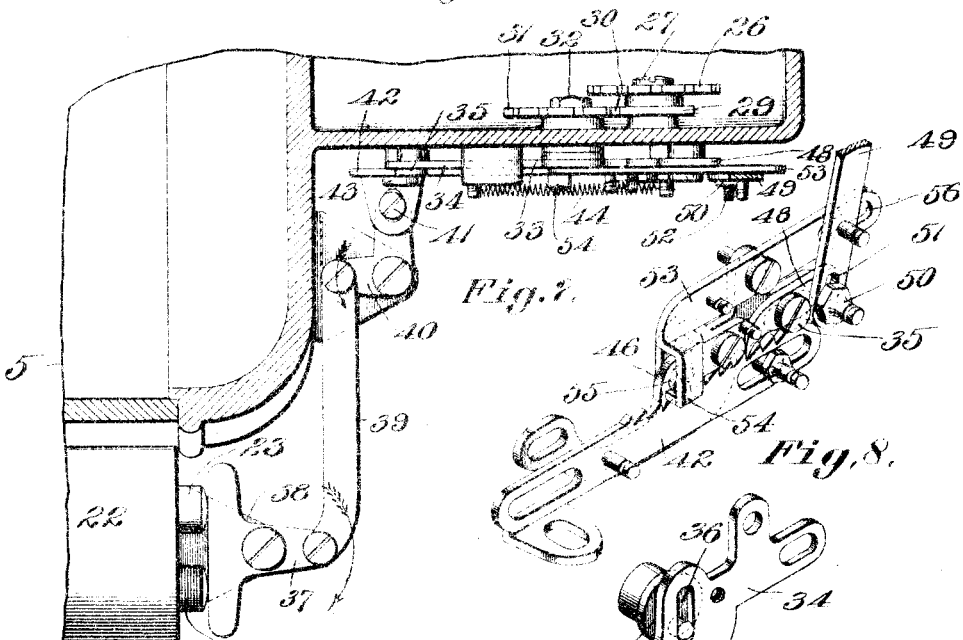

In the drawings Figure 1 is a side elevation of a Dalton adding machine and motor with my present invention combined therewith. Fig. 2 is a sectional view of a part of the motor mechanism and illustrates a part of the devices which operate to cut off the power from the motor. Fig. 3 is a sectional view of the same mechanism, taken approximately on the line 3—3 of Fig. 2. Fig. 4 is a perspective view of a train of gearing included in my present invention. Fig. 5 is a side elevation of a part of the motor driven mechanism and illustrates the connections which are operated by the motor to cut off the power therefrom. Fig. 6 is a sectional view illustrating the same mechanism taken approximately on the line 6—6 of Fig. 5. Fig. 7 is a perspective view of a part of the train of connections operated by the motor to cut off the power therefrom. Fig. 8 is a perspective view of another part of the train of connections controlled by the motor for cutting off the power.

The adding and recording mechanisms of the Dalton adding machine are not illustrated in detail in the accompanying drawings because it is not essential that said mechanisms be completely illustrated in order to understand the nature and purpose and mode of operation of the present invention. The adding and recording mechanisms are controlled in their operations, by a rock shaft 1 supported in bearings within the case of the machine. When it is desired to operate the adding and recording mechanisms, the rock shaft 1 is rocked in one direction against the tension of springs 2, which are engaged with some portion of the frame of the machine and also with an arm or lever 3 attached to the rock shaft. When the adding and recording mechanisms have completed their movement and the rock shaft 1 is released, said shaft is returned to its idle or normal position, as shown in Fig. 1, by the power of the springs 2. When the rock shaft 1 is to be controlled by a motor, the base of the machine is mounted on a supporting frame 4 which also supports the motor 5 and connections whereby the motor may be caused to rock the shaft 1 in one direction and then release the said shaft so that the power springs 2 may restore said shaft and the other parts to their idle positions. An arm or lever 6, which may be a part of the arm or lever 3 or separate therefrom as desired, extends through a slot in the base of the machine and is arranged so that it will be engaged by a lever 7 controlled by the motor. The operation of the lever 7, which is pivotally supported at 8, operates the lever 6 effectively to rock the shaft 1 in one direction, and is released from said lever 6 at the end of its stroke so that the power springs 2 will rock the said shaft 1 in the opposite direction to its idle or normal position. The lever 7 is returned to idle position after each movement of the motor, by a spring 9.

The motor 5 is a continuously running motor and rotates a shaft 10 on which is a worm 11, (Fig. 2). The worm 11 is in constant mesh with a wheel 12 loosely mounted on a shaft 13, so that said wheel 12 will be in constant and rapid rotation when the motor is running. A disk 14 having notches forming teeth on its periphery is attached to and rotates with the wheel 12. A support 15 is attached to the shaft 13 and carries a latch device 16 which is normally held out of engagement with the disk 14 by means of suitable connections 17 which do not require specific description in this specification for the reason that said connections are not specifically claimed herein, and for the further reason that said connections constitute a part of the subject-matter of a copending application. It is obvious that when the motor is running, the wheel 12 and disk 14 will be in constant and rapid rotation and if the latch device 16 be engaged with the disk 14 the shaft 13 will be rotated until said latch device is released. In or near the key-board of the machine, (Fig. 1) a key 18 is mounted and is provided with a train of connections 19 whereby the latch device 16 may be caused to engage with the disk 14. The shaft 13 has on one end thereof an eccentric disk 20 which, when rotated, rolls against a lateral extension 21 on the lever 7 effectively to operate and cause said lever to engage the lever 6 and rock the shaft 1 in one direction in opposition to the power of the springs 2 and thereby permit the adding and recording mechanism of the machine to operate to perform their various functions. The motor 5 is controlled by switch mechanism 22 which may be of any suitable or well known type, and which may be thrown "on" or "off" as desired, by pressing inwardly the buttons 23 and 24, respectively. That is to say, when the button 23 is pressed inwardly the power will be turned "on" and the motor will be operated, and the shaft 1 may be intermittently rocked as the result of the manipulation of the key 18 as above explained. By pressing inwardly the button 24, however, the power will be turned "off" and the motor will be stopped. The subject-matter of the present application comprises mechanism controlled by the motor and a part of the devices above described, for operating the switch 22 to turn the power "off", after a suitable interval and as an incident to leaving the adding and recording mechanisms idle.

Should the operator be called away or leave the machine without operating the switch to turn "off" the power, this desirable result will be effected automatically by my invention. However, if the machine is operated at frequent intervals the power will not be cut "off", as this would be the occasion of considerable inconvenience. My invention, therefore, includes mechanism or devices, operated incidently to each operation of the devices which rock the shaft 1, to disable or cause to return to idle position the mechanism which controls the switch.

The wheel 12 carries a pin 25 which, at each revolution of the wheel 12, engages a disk 26 rotatably supported upon a stud 27 and rotates said disk the distance of one tooth. The ends of the teeth on the disk 26 are concave and fit close to the periphery of the hub of the wheel 12. Said disk 26 is thereby locked against accidental rotation until the pin 25 engages with said disk, at which time the tooth of the said disk 26 so engaged enters a notch or recess 28 in the hub of the wheel 12 and said disk is thereby permitted to turn the distance of one tooth. In this way the disk 26 will be turned the distance of one tooth at each revolution of the wheel 12 and locked against accidental rotation.

At the side of and rigid with the disk 26 is a disk 29 having a single tooth or projection 30 on its periphery. A disk 31 of a construction similar to the disk 26 has its teeth extending close to the periphery of the disk 29 (Fig. 4) so that said disk 31 will be locked against rotation until turned the distance of one tooth at each revolution of the disks 26 and 29. Therefore, since the disk 26 is turned the distance of only one tooth for each complete revolution of the wheel 12, and since the disk 31 is rotated the distance of only one tooth for each complete revolution of the disk 26, it is clear that the wheel 12, which is driven by the motor shaft 10, will make a large number of revolutions before the disk 31 will be turned a complete revolution. Thus the differential gearing which is locked against accidental rotation by the wheel 12 is also driven or rotated by the wheel 12.

The disk 31 is rigid on a stud 32 which projects through the housing or case inclosing the mechanism last described and has on its outer end a crank 33. A pawl carrier 34 is slidably supported by the case or housing for the mechanism, by studs 35 extending through slots in said pawl carrier and permitting longitudinal movement thereof. The crank 33 extends into a vertical slot in the pawl carrier 34 so that said pawl carrier will be slowly reciprocated longitudinally whenever the motor is running, the train of differential gearing from the wheel 12 constituting the mechanism for reciprocating pawl carrier.

A T-shaped lever 37 is pivoted upon a support 38 close to the switch buttons 23 and 24 and is operable to actuate said switch buttons to control the switch and turn the power "on" or "off." A link 39 connects the stem of the lever 37 with one arm of a bell crank lever 40, the opposite arm of said bell crank lever having pin and slot connection 41 with a sliding actuator 42.

The actuator 42 is supported by studs 43 projecting through longitudinal slots therein and engaging the housing or case of the mechanism. A spring 44 connects the actuator 42 with one of the studs 43 and actuates said actuator in the direction of the arrow 45, (Fig. 5). The spring 44 has sufficient strength to cause the connections to operate the lever 37, to press in the button 23 controlling switch to turn the power "on." The pawl carrier 34 carries a pawl 46 which is arranged to engage with teeth formed on the upper edge of the actuator 42, a spring 47 pressing said pawl into engagement with said actuator. When the pawl carrier 34 is moved in one direction by crank 33 the pawl 46 will slide over the teeth on the actuator 42 until the pawl carrier reaches the end of its movement. Continued operation of the crank 33 moves the pawl carrier in the opposite direction and the pawl 46 is thereby engaged with one of the teeth on the actuator 42, and the said pawl carrier is moved in opposition to the tension of the spring 44. This movement of the pawl carrier is translated to the connections leading therefrom, to the lever 37, producing a movement of said connections as indicated by the arrows in Fig. 6. A sufficient extent of such movement will cause the lever 37 to press inwardly, the button 24 controlling the switch to cut off the power. It is preferable that several reciprocations or movements of the pawl carrier 34 be required, before the lever 37 will be moved a sufficient distance to cut off the power. To prevent the actuator 42 from being moved by the spring 44, after said actuator has been moved by the pawl 46, a latch pawl 48 is provided and, in the present instance, is pivoted upon one of the studs 35. The said latch pawl 48 also engages with the teeth of the actuator 42 and holds said actuator in any position to which it may be moved by the several operations of the pawl 46.

From the foregoing it is apparent that when the motor is running, the switch 22 will be operated automatically, after a suitable interval, to cut "off" the power and cause the motor to stop. When it is desired to use the machine, it is essential that the operation of the mechanism for cutting off the power be interrupted so that the machine may be operated by the motor, without inconvenience. For this purpose, and for the purpose of operating the switch to turn "on" the power, suitable connections from the key 18 are provided. The connections 19 have been previously referred to and it was stated that these connections are moved by the key 18 to control the operating connections between the motor mechanism and the mechanism to be actuated thereby. By reference to Fig. 1 it will be plainly seen that depression of the key 18 will move the connections 19 downwardly. A link 49 is supported by the connection 19 and said link extends alongside of the pawl 48. A pin 50 on the tail of the pawl 48 extends through a slot 51 in the lower end of the link 49. A spring 52 connects said pin 50 with the link 49 and actuates the pawl 48 into engagement with the teeth on the actuator 42. The slot 51 and the spring 52 permit the actuator 42 to be freely moved in one direction by the pawl 46, to turn "off" the power, but the said spring 52 will cause the pawl 48 to engage with and hold the actuator after the actuator has been moved by said pawl 46. It is apparent that depression of the key 18 will also depress the link 49, and that downward movement of the link 49 will disengage the pawl 48 from the actuator 42 and permit the spring 44 to move said actuator and the connections therefrom to cause the lever 37 to press inwardly, the switch button 23, and turn on the power. To permit such operation, however, it is also essential that the pawl 46 be disengaged from the actuator 42. For this purpose a lever 53 is pivotally supported by the pawl carrier 34 and has an extension 54 projecting under a lug 55 on the pawl 46, the opposite end of said lever having pin and slot connection with the link 49, whereby downward movement of said link 49 will cause the lever 53 to move the pawl 46 out of engagement with the actuator 42, in addition to disengaging the pawl 48 from said actuator as above described. Thus, when the key 18 is depressed the two pawls 42 and 48 will be disengaged from the actuator 42 and the strong spring 44 will immediately act to operate the switch 22 and turn on the power, whereupon the motor will operate.

From the foregoing, it will be understood that of the train of gearing, including the worm 11, the wheel 12, and the members 26, 29, and 31, only the worm 11 and the wheel 12 are in constant motion when the motor is running, it being apparent that the other members of the train, including the disks 26 and 31, as well as the member 29, are only intermittently operated. Thus, it may be said that a part of the train of gearing for cutting off the power operates intermittently during operation of the motor, while the remainder of the train of gearing for cutting off the power is in constant motion when the motor is running.

The mechanism arranged substantially as shown and described, will permit the motor to run several minutes before the switch will be operated to turn off the power. This period of several minutes affords time sufficient for the user or operator of the machine to perform any work necessary for setting up numbers in the machine before the motor will be stopped. The first operation of the key 18 to turn on the power causes the lever 7 to be rocked, and each subsequent operation of the key 18 will cause the lever 7 to be operated when the motor is running. Each operation of the key 18 also releases the pawls 46 and 48 from the actuator 42 so that the spring 44 will be effective to hold the switch in position with the power turned on. From the foregoing it will be seen that the mechanism for cutting off the power is operated automatically by the power driven mechanism, and requires no previous arrangement or adjustment. By suitable variation in the differential gearing, the devices may be timed so that they will operate to cut off the power at any desired interval after leaving the machine idle. It will be noted that, in the embodiment shown, the automatic mechanism for cutting off the power is controlled by the same key which is operable to cause the power to be turned on, and which is also operable to entrain the connections so that the motor will operate the lever 7 and thereby rock the shaft 1.

While I have shown my invention combined with a Dalton adding machine it is clear that it is applicable for use with various types of machines. It is also apparent that there may be wide variations in the construction and arrangements of the parts without departing in the least, from the spirit and scope of my invention. I do not restrict myself to the specific construction, arrangement, or embodiment shown, but desire to include within the scope of the claims, various variations of the invention.

What I claim and desire to secure by Letters Patent is—

1. The combination with a motor, a switch controlling the admission of power to said motor, and an element arranged to be actuated by said motor, of a lever for operating said switch to turn the power off and on, automatic means for operating said lever to turn on the power, and automatic means for operating said lever to turn off the power when said element is idle a predetermined length of time.

2. The combination with a motor, a switch controlling the admission of power to said motor, and an element arranged to be actuated by said motor, of a lever for operating said switch to turn the power off and on, automatic means for operating said switch to turn on the power, and means driven by the motor for actuating said automatic means to turn off the power when said element remains idle a predetermined length of time, substantially as specified.

3. The combination with a motor, a switch controlling admission of power to said motor, and an element arranged to be actuated by said motor, of automatic means for operating said switch to admit power to said motor, manipulative means determining when said automatic means shall operate, and means driven by the motor for operating said automatic means to turn off the power when said element remains idle a predetermined length of time, substantially as specified.

4. The combination with a motor, a switch controlling the admission of power to said motor, and automatic means for operating said switch to admit power to said motor, of a shaft arranged to be driven by said motor, and means driven by the motor for operating said automatic means to turn off the power when said shaft remains idle a predetermined length of time.

5. The combination with a shaft, and a motor for driving said shaft, of a switch controlling the admission of power to said motor, automatic means for operating said switch to admit power to said motor, and connections for operating said automatic means to turn off the power when said shaft remains idle a predetermined time.

6. The combination with a motor, an element arranged to be operated by said motor, a switch controlling the admission of power to said motor, and connections for operating said switch to admit power to said motor, of means driven by the motor for operating said connections to turn off the power when said element remains unoperated for a predetermined length of time.

7. The combination with a motor, a switch controlling the admission of power to said motor, and connections for operating said switch to turn on the power, of automatic means for operating said connections, means driven by the motor for actuating said connections to turn off the power, and appliances for disabling said last-named means, substantially as specified.

8. The combination with a motor, a switch controlling the admission of power to said motor, and connections for operating said switch to turn on the power, of manipulative means controlling the operation of said connections, means driven by the motor for actuating said connections and said switch to turn off the power, and evices controlled by said manipulative means for disabling said last-named means, substantially as specified.

9. The combination with a motor, and a switch controlling the admission of power to said motor, of a lever for operating said switch to turn the power off and on, automatic means for operating said switch to turn on the power, and a manipulative device determining when said automatic means shall operate, substantially as specified.

10. The combination with a motor, and a switch controlling the admission of power to said motor, of a lever for operating said switch to turn the power off and on, automatic means for operating said lever and switch to turn on the power, means driven by the motor for operating said automatic means and thereby said lever and said switch to turn off the power, and manipulative device determining when said automatic means shall operate to turn on the power, substantially as specified.

11. The combination with a motor, and a switch controlling the admission of power to said motor, of a lever for operating said switch to turn the power off and on, automatic means for operating said lever to turn on the power, means driven by the motor for operating said automatic means and thereby said lever and said switch to turn off the power, and manipulative device determining when said automatic means shall operate to turn on the power and also disabling the means actuated by the motor for causing said automatic means to turn off the power.

12. The combination with a motor, a switch controlling the admission of power to said motor, and an element arranged to be actuated by said motor, of a lever for operating said switch to turn the power off and on, connections for operating said lever and thereby said switch to turn on the power, automatic means for operating said connections, and an actuating device driven by the motor for operating said connections effectively to cause said lever and said switch to turn off the power when said element remains idle a predetermined length of time, substantially as specified.

13. The combination with a motor, and a switch controlling the admission of power to said motor, of a lever for operating said switch to turn the power off and on, automatic devices for actuating said lever and said switch to turn on the power, means driven by the motor for actuating said automatic devices effectively to turn off the power, and manipulative means controlling said automatic devices.

14. The combination with a motor, and a switch controlling the admission of power to said motor, of a lever for actuating said switch to turn the power off and on, an element for actuating said lever to turn on the power, automatic means for operating said element to turn on the power, manipulative means determining when said element shall be operated, and means driven by the motor for actuating said element to turn off the power, substantially as specified.

15. The combination with a motor, and automatic means for admitting power into said motor, of devices driven by the motor for actuating said automatic means to turn off the power, after a predetermined length of time, substantially as specified.

16. The combination with a motor, an element controlling the admission of power to said motor, automatic means for operating said element to turn on the power, and means driven by the motor to cut off the power, of manipulative devices determining when said automatic means shall operate and disabling said means for cutting off the power.

17. The combination with a motor, a switch controlling the admission of power to said motor, a lever for operating said switch to turn the power off and on, and automatic means for operating said lever to turn on the power, of means driven by the motor to cut off the power after a predetermined time, and manipulative means determining when the power shall be turned on and operable to disable said means for turning off the power, substantially as specified.

18. The combination with a motor, a shaft arranged to be operated by said motor, automatic means for admitting power to said motor, and manipulative means determining when said automatic means shall operate and also determining when said motor shall operate said shaft, of means operated by the motor effectively to cut off the power, and means whereby said manipulative means will disable said means for cutting off the power.

19. The combination with a motor, a switch controlling the admission of power to said motor, automatic means for operating said switch to admit power to said motor, and a shaft arranged to be operated by said means, of devices driven by the motor for actuating said automatic means to cut off the power from said motor, and manipulative means determining when said automatic means shall operate to turn on the power and when said shaft shall be operated, substantially as specified.

20. The combination with a motor, a switch controlling the admission of power to said motor, automatic means for operating said switch to turn on the power, automatic means for operating said switch to turn off the power, and a shaft arranged to be operated by said motor, of manipulative means determining when the power shall be turned on and also determining when said shaft shall be operated, and devices controlled by said manipulative means for disabling the means for cutting off the power, substantially as specified.

21. The combination with a motor, a switch controlling the admission of power to said motor, and an element arranged to be operated by said motor, of a lever for operating said switch to turn the power off and on, automatic means for operating said lever to turn on the power, automatic means for operating said lever to turn off the power when said element remains unoperated a predetermined length of time, and means for preventing the turning off of the power, 22. The combination with a motor, a switch controlling the admission of power to said motor, and an element arranged to be operated by said motor, of a lever for operating said switch to turn the power off and on, automatic means for operating said lever to turn on the power, automatic means for operating said lever to turn off the power when said element is idle a predetermined length of time, and means controlling the operation of said element by said motor and preventing the turning off of the power.

23. The combination with a motor, a switch controlling the admission of power to said motor, and an element movable in one direction to operate said switch to turn on the power and in the opposite direction to turn off the power, of automatic means for actuating said element to turn on the power, and a reciprocating device actuated by the motor and arranged to move said element to turn off the power.

24. In a device of the character described, the combination with a motor, a switch controlling the admission of power to said motor, and an actuator for operating said switch to turn the power off and on, of a device operated by the motor and controlling said actuator to turn off the power after a predetermined time, means for disabling said device, and means controlling said actuator to keep the power on constantly as an incident to the disabling of said device before the power is turned off.

25. The combination with a motor, and a switch controlling the admission of power to said motor, of an actuator for operating said switch to turn the power off and on, a device driven by the motor and controlling said actuator to turn off the power after a predetermined time, an element to be actuated by the motor, means for causing said motor to operate said element, and means for causing said actuator to keep the power turned on constantly so long as said element is actuated prior to the time at which the power would be turned off if said element had not been actuated.

26. The combination with a motor, and a switch controlling the admission of power to said motor, of an element arranged to be operated by said motor, means for causing said motor to operate said element, an actuator for causing said switch to turn the power off and on, means driven by the motor for causing said actuator to operate said switch to turn off the power after a predetermined length of time when said element remains unoperated for said time, and means controlling said actuator to keep the power turned on constantly so long as said element is operated before the lapse of the time in which the power would have been turned off.

27. The combination with a motor, and a switch controlling the admission of power to said motor, of a device for operating said switch to turn the power off and on, automatic means for operating said device to turn on the power, means driven by the motor for operating said automatic means to turn off the power, and a manipulative device determining when said automatic means shall operate to turn on the power and also preventing the turning off of the power.

28. The combination with a motor, and a switch controlling the admission of power to said motor, of a device for operating said switch to turn the power off and on, automatic means for operating said device to turn on the power, an element normally disengaged from said device, means driven by the motor for operating said element, means for engaging said element with said device and thereby operating said device to turn off the power after a predetermined length of time, and means for preventing the turning off of the power as aforesaid, substantially as described.

29. In a machine of the character described, the combination with an actuating motor, and a switch controlling the admission of power to said motor, of an actuator for said switch, a spring for moving said actuator in one direction to close the switch, and gearing driven by the motor to move said actuator in the other direction to open the switch.

30. In a machine of the character described, the combination with a motor for operating the machine proper, a switch controlling the admission of power to said motor and arranged to be opened and closed to turn the power off and on, of an actuator for said switch, a spring arranged to move said actuator in one direction to close said switch, gearing driven by the motor, and an operating pawl driven by said gearing effectively to move said actuator to open the switch.

31. In a machine of the character described, the combination with the actuating motor, and a switch controlling the admission of power to said motor and arranged to be opened and closed to turn the power off and on, of an actuator, connections from said actuator to said switch, automatic means for operating said actuator in one direction to turn on the power, and gearing driven by the motor for operating said actuator in the opposite direction to turn off the power.

32. In a machine of the character described, the combination with a motor, and a switch arranged to be opened and closed to turn the power off and on, of a reciprocating actuator connected to said switch, automatic means for moving said actuator in one direction to close said switch and turn on the power, gearing driven by the motor, a pawl driven by said gearing and engaging said actuator effectively to move said actuator in opposition to said spring effectively to turn off the power, and a detent holding said actuator in the position to which it is moved by said pawl.

33. In a machine of the character described, the combination with a motor, and a switch controlling the admission of power to said motor, of an actuator for said switch, and gearing driven intermittently when the motor is in operation for moving said actuator to open said switch.

In testimony whereof, I have signed my name to this specification in the presence of two subscribing witnesses.

HARRY LANDSIEDEL.

In the presence of—
BIRNEY KYSARL,
B. C. HARRISON.